J. W. FELLMETH.
ACTUATING DEVICE FOR CLUTCHES.
APPLICATION FILED AUG. 28, 1916.

1,232,520.

Patented July 10, 1917.

INVENTOR.
Jacob W. Fellmeth
BY
Edward Reed
ATTORNEY

UNITED STATES PATENT OFFICE.

JACOB W. FELLMETH, OF MARION, OHIO, ASSIGNOR TO THE MARION STEAM SHOVEL CO., OF MARION, OHIO, A CORPORATION OF OHIO.

ACTUATING DEVICE FOR CLUTCHES.

1,232,520.  Specification of Letters Patent.  Patented July 10, 1917.

Application filed August 28, 1916. Serial No. 117,151.

*To all whom it may concern:*

Be it known that I, JACOB W. FELLMETH, a citizen of the United States, residing at Marion, in the county of Marion and State of Ohio, have invented certain new and useful Improvements in Actuating Devices for Clutches, of which the following is a specification, reference being had therein to the accompanying drawing.

This invention relates to an actuating device for clutches and the like and is in the nature of an improvement upon the device shown and claimed in Patent No. 1,128,006, granted to C. B. King and J. W. Fellmeth, Feb. 9, 1915.

The object of the invention is to provide an actuating device of this kind which will be very simple and compact in its construction and can be applied to friction clutches, or the like, of a small size, as well as to the larger ones; it is also an object of the invention to so construct the device that it will have a large amount of strength in proportion to its weight; and further to produce such a device which will be inexpensive to manufacture and will have no part which can be easily broken or disarranged.

Figure 1:
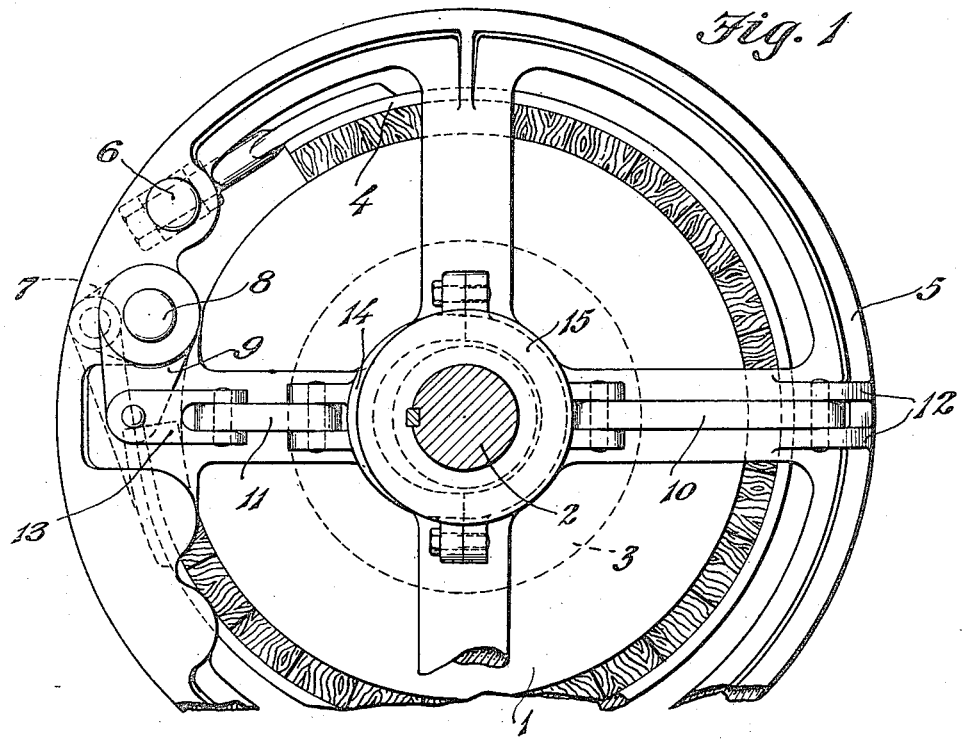
Figure 2:
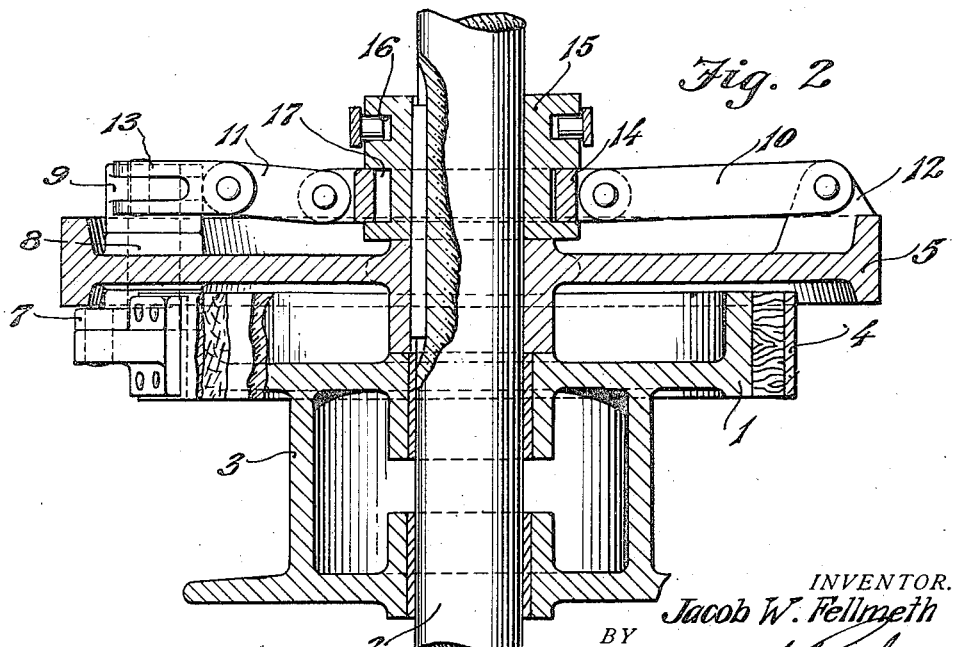

In the accompanying drawings Figure 1 is a side elevation, partially broken away, of a clutch, showing my invention applied thereto; and Fig. 2 is a sectional view taken centrally of the clutch and partially broken away.

In these drawings I have illustrated one embodiment of my invention and have shown the same as applied to a friction clutch in which one of the friction members comprises a drum 1 rotatably mounted upon a shaft 2 and having connected therewith a part to be operated, such as the cable drum 3. The other friction member is shown as comprising a band 4 extending about the friction drum 1 and carried by a supporting device, such as a wheel 5, rigidly secured to the shaft 2. One end of the band is rigidly secured to a stud 6 carried by the supporting device 5, while the other end of the band is connected with a crank arm 7 secured to a second stud 8, journaled in the supporting device 5 and having on its other end a crank arm 9 by means of which the stud may be rocked in its bearing to move the friction member into or out of operative engagement on the first mentioned friction member, or drum.

The actuating device is in the nature of a toggle and in the present construction comprises arms 10 and 11, the arm 10 being pivotally mounted on an axis fixed with relation to the movable clutch member, or band, 4, so that it will have no movement when the toggle is operated to move the clutch member. In the present instance the arm 10 is mounted at its outer end upon lugs 12 carried by the supporting device 5. The other arm, 11, is operatively connected with the movable friction member, this being accomplished in the present instance by connecting the same with the end of the crank arm 9 on the stud 8. Preferably, the connection is formed by means of a link 13 pivotally connected at its ends with the arm 11 and the crank arm 9. The two arms 10 and 11, of the toggle are connected one to the other by means of a connecting device, such as a link 14, which is so mounted that it is capable of movement parallel with the axis of the friction members to cause the arms, 10 and 11, to be moved about their axes and, because of the fixed axis for the arm 10, to cause longitudinal movement to be imparted to the arm 11, thus actuating the movable friction member. The connecting device, or link, 14, is also capable of movement transversely to the axis of the friction members to permit it to accommodate itself to the changed position of the inner end of the arm 10 due to the movement of the latter about its fixed axis. In the present construction this connecting device is actuated to manipulate the toggle by means of a collar 15, slidably mounted on the shaft 2 and having a circumferential groove 16 to receive a yoke by means of which it may be connected with an actuating lever. Preferably, the connecting device, or link, 14, extends about the collar 15 and is pivotally connected on the opposite sides thereof with the inner ends of the toggle arms, 10 and 11. It is retained in position upon the collar by being seated in a circumferential groove 17 formed therein, the link being formed in two parts to permit it to be placed upon the collar. The central opening through which the collar extends is elongated lengthwise of the link to permit the latter to have bodily movement transversely to the axis of the collar.

The operation of the device will be readily understood from the foregoing description and it will be apparent that by moving the collar 15 along the shaft 2, the arms, 10 and 11, of the toggle will be moved about their axes and the distance between the outer ends thereof varied, thus rocking the stud 8, with which the arm 11 is connected, about its axis to contract or expand the friction band, according to the direction of the movement of the collar. Because of the fixed axis of the outer end of the arm 10 longitudinal movement will be imparted only to the arm 11, this movement being permitted by the transverse movement of the connecting device, or link, 14.

While I have shown and described the invention applied to a particular type of friction clutch it will be apparent that it can be applied with equal facility to various kinds of clutches, brakes and the like. For example, the clutch shown in the above mentioned patent comprises an interiorly arranged expansible friction band, which in one form of the device is actuated by a toggle connected with the ends thereof and with the actuating device, while in the other form shown in the patent the two ends of the band are actuated by oppositely threaded screws mounted in a nut which is connected with the actuating device. Obviously, the present actuating device could be substituted for that shown in the patent and the arm 11 connected with either the toggle or the screw. It will also be apparent that it is not essential to the operation of the mechanism that the friction drum should be journaled on the shaft and the supporting member fixed thereon, as herein described, and that the reversal of this arrangement would be a full equivalent of that here shown. Therefore I wish it to be understood that I do not desire to be limited either to the type of device to which the invention is applied or to the details of construction of the actuating device as various modifications will occur to a person skilled in the art.

Having now fully described my invention, what I claim as new, and wish to secure by Letters Patent, is:—

1. The combination with coöperating friction members rotatable about a common axis, one of which is movable into and out of operative engagement with the other, of an arm pivotally mounted on an axis fixed with relation to said movable member, a second arm connected with said movable member and capable of lengthwise movement to actuate the same, an operating member mounted for movement lengthwise of said axis, and a part interposed between and connected with said arms, said part being connected with said operating member for axial movement therewith and for bodily movement transversely thereto.

2. The combination with coöperating friction members rotatable about a common axis, one of which members is movable into and out of operative engagement with the other, of a pair of arms arranged transversely to said axis and having their inner ends adjacent one to the other, one of said arms being pivotally mounted at its outer end on an axis fixed with relation to said movable part, the other of said arms having its outer end connected with said movable member and being capable of lengthwise movement to actuate the same, an operating member mounted for movement lengthwise of said axis, a link pivotally connected with the inner ends of said arms and slidably mounted on said operating member for axial movement therewith and for lengthwise movement transversely thereto.

3. The combination with a shaft, and a pair of coöperating friction members, one of said members being connected with said shaft for rotation therewith, the other of said members being rotatable about the axis of said shaft independently thereof, and one of said members being movable into engagement with the other member, of a pair of arms arranged on opposite sides of said shaft, one of said arms being pivotally mounted on an axis fixed with relation to said movable member, the other arm being connected with said movable member and capable of lengthwise movement to actuate the same, and an operating member mounted for movement lengthwise of said shaft, and a device operatively connected with said arms and slidably connected with said operating member for movement both longitudinally of and transversely to said shaft.

4. The combination with a shaft and a pair of coöperating friction members, one of said members being connected with said shaft for rotation therewith, the other of said members being rotatable about the axis of said shaft independently thereof, and one of said members being movable into and out of engagement with the other member, of a pair of arms arranged on opposite sides of said shaft, one of said arms being pivotally mounted on an axis fixed with relation to said movable member, the other arm being connected with said movable member and capable of lengthwise movement to actuate the same, a connecting device extending about said shaft pivotally connected with the adjacent ends of said arms and capable of movement both axially and transversely to said shaft, and means for actuating said connecting device.

5. The combination with a shaft and a pair of coöperating friction members, one of said members being connected with said shaft for rotation therewith, the other of said members being rotatable about the axis of said shaft independently thereof, and one of said members being movable into and out of engagement with the other member, of a pair of arms arranged on opposite sides of said shaft, one of said arms being pivotally mounted on an axis fixed with relation to said movable member, the other arm being connected with said movable member and capable of lengthwise movement to actuate the same, a collar slidably mounted on said shaft, a connecting device extending about said collar and pivotally connected with the adjacent ends of said arms, said connecting device being held against lengthwise movement relative to said collar and being capable of movement transversely to the axis of said collar.

6. An actuating device of the character described, comprising a toggle having one arm mounted for longitudinal movement and the other arm pivotally mounted and held against longitudinal movement, an operating member for said toggle, and a device connected with said arms and slidably mounted on said operating member for movement therewith to cause the last-mentioned arm to move about its axis and for movement relatively thereto to impart lengthwise movement to the first-mentioned arm.

7. The combination with a shaft, a friction member journaled thereon, a supporting device fixed thereon and a second friction member carried by said supporting device, of a collar slidably mounted on said shaft, a connecting device slidably mounted on said collar for axial movement therewith and for movement transversely thereto, an arm pivotally connected at one end with said support and at the other end with said connecting device, and a second arm pivotally connected at one end with said connecting device and connected at its opposite end with that friction member which is carried by said supporting device.

8. The combination with a shaft, a friction member journaled thereon, a supporting device fixed thereon and a second friction member carried by said supporting device, of a toggle having one arm pivotally mounted at its outer end on said supporting device and having its other arm operatively connected at its outer end with the last-mentioned friction member, a connecting device extending about said shaft, pivotally connected with the adjacent ends of said arms and mounted for movement both lengthwise and transversely to said shaft, and means for actuating said connecting device.

9. The combination with a shaft, a friction member journaled thereon, a supporting device fixed thereon and a section friction member carried by said supporting device, of a collar slidably mounted on said shaft and having a circumferential groove, a connecting device mounted in said groove and having an elongated opening to permit it to move transversely to said collar, an arm pivotally connected at one end with said connecting device on one side of said shaft and pivotally connected at its other end with said supporting device, and a second arm pivotally connected at one end with said connecting device on the other side of said shaft and operatively connected at its other end with the last-mentioned friction member.

10. The combination with a shaft, a friction drum loosely mounted thereon, a supporting device rigidly secured to said shaft, a friction band extending about said drum and having one end secured at a fixed point to said supporting device, a rock shaft mounted on said supporting device, a crank arm carried by said rock shaft and secured to the other end of said friction band, and a second crank arm secured to said rock shaft, of a toggle having one arm connected with said second crank arm and having its other arm pivotally mounted on said supporting device, a collar slidably mounted on said shaft, a slotted device mounted on said collar for movement transversely thereof and connected with the adjacent ends of said arms, said connecting device being held against axial movement on said collar.

11. The combination with a shaft, a friction member journaled thereon, a supporting device fixed on said shaft, and a second friction member carried by said supporting device, of a collar slidably mounted on said shaft and having a circumferential groove, a connecting device mounted in said groove and having an elongated opening to permit it to move transversely to said collar, an arm pivotally connected at one end with said connecting device and pivotally connected at its other end with said supporting device, and a second arm pivotally connected at one end with said connecting device and operatively connected at its other end with the last-mentioned friction member.

In testimony whereof, I affix my signature hereto.

JACOB W. FELLMETH.

Copies of this patent may be obtained for five cents each, by addressing the "Commissioner of Patents, Washington, D. C."